(12) United States Patent  
Robinson (10) Patent No.: US 7,516,439 B2  
(45) Date of Patent: Apr. 7, 2009

(54) METHOD AND SYSTEM FOR CREATING REUSABLE SOFTWARE COMPONENTS THROUGH A UNIFORM INTERFACE

(76) Inventor: Marck R. Robinson, 15193 SE. 54th Pl., Bellevue, WA (US) 98006

( * ) Notice: Subject to any disclaimer, the term of this patent is extended or adjusted under 35 U.S.C. 154(b) by 249 days.

(21) Appl. No.: 11/398,847

(22) Filed: Apr. 5, 2006

(65) Prior Publication Data

US 2007/0074158 A1    Mar. 29, 2007

Related U.S. Application Data

(63) Continuation of application No. 10/047,457, filed on Jan. 14, 2002, now abandoned.

(60) Provisional application No. 60/261,119, filed on Jan. 12, 2001.

(51) Int. Cl.
*G06F 9/44* (2006.01)
*G06F 7/00* (2006.01)

(52) U.S. Cl. .................. 717/103; 717/108; 717/111; 717/116; 717/120; 707/101; 707/102; 707/103 R; 707/103 Y (58) Field of Classification Search ............... None
See application file for complete search history.

(56) References Cited

U.S. PATENT DOCUMENTS 5,630,168 A    5/1997    Rosebrugh et al.
5,734,887 A *  3/1998    Kingberg et al. ............... 707/4
5,872,973 A    2/1999    Mitchell et al.
5,970,252 A    10/1999   Buxton et al.
5,978,579 A    11/1999   Buxton et al.
6,438,744 B2   8/2002    Toutonghi et al.
6,591,272 B1   7/2003    Williams
6,801,926 B1 * 10/2004   Shisler et al. ............... 709/201

* cited by examiner

*Primary Examiner*—Chuck O Kendall
(74) *Attorney, Agent, or Firm*—Seed IP Law Group PLLC (57) ABSTRACT

A method for designing software components for integration into any system without additional coding is provided. The method includes adopting a uniform application programming interface that breaks down external objects to include the characteristics of object, attribute, and method. Ideally, the characteristics include create object, delete object, read attributes, write attributes, and invoke behavior. A software tool is provided for communication between an API and a data source, the tool including a join engine adapted to provide communication between at least one view and at least one base source associated with the data source, the join engine further adapted to update the at least one base source in response to updates to the view. Ideally, the tool is further configured to support on the at least one base source operations of create object and delete object on the at least one view. The software tool is also configured to map events in the at least one base source to the at least one view, and can be configured to create virtual attributes based on the view through operations or expressions performed on the view, including, but not limited to algebraic expressions, names, strings, and functions.

24 Claims, 4 Drawing Sheets

*Illustration 1 – Powerflow Interface*

FIGURE 6

Illustration 2 – Powerflow Traditional Integration

FIGURE 7

Illustration 3 – Powerflow AOM Integration

METHOD AND SYSTEM FOR CREATING REUSABLE SOFTWARE COMPONENTS THROUGH A UNIFORM INTERFACE

TECHNICAL FIELD

The present invention relates to software development and, in particular, to computer software that provides tools to create reusable software components using a uniform interface.

DESCRIPTION OF THE RELATED ART

Interfaces are tools that allow objects of arbitrary classes to be joined into compound documents. With respect to the management of databases, such joins take place to facilitate the manipulation of data from multiple tables or databases in a new view that is a virtual representation of the "physical" base table. Updating the data in the base table through the new view is problematic because of the presence of redundant data and the difficulty of consistently updating this data.

On a larger scale, designing and implementing software solutions through a single integrated solution requires functional cooperation among a collection of disparate components. Oftentimes, these components are designed with abstractions that are application specific, and adaptation is required to cooperate with other components in the system. More particularly, functionality of the system depends on accurate and reliable communication among the components. Thus, substantial time and costs are involved in modifying the components to achieve the functionality required by the system.

SUMMARY OF THE INVENTION

The disclosed embodiments of the invention are, in one form, directed to a software tool for communication between an application program interface (API) and a data source, and in another form to a method for designing software components to be integrated into any system without additional coding.

In one embodiment, a method for designing software components for integration into any system without additional coding is provided. The method includes adopting a uniform application programming interface that breaks down external objects to include the characteristics of object, attribute, and method. Ideally, the characteristics include create object, delete object, read attributes, write attributes, and invoke behavior.

In accordance with another embodiment of the invention, a software tool is provided for providing communication between an API and a data source, the tool including a join engine adapted to provide communication between at least one view and at least one base source associated with the data source, the join engine further adapted to update the at least one base source in response to updates to the view. Ideally, the tool is further configured to support on the at least one base source operations of create object and delete object on the at least one view.

In accordance with another aspect of the foregoing embodiment, the software tool is configured to map events in the at least one base source to the at least one view. Preferably, the tool is also configured to create virtual attributes based on the view through operations or expressions performed on the view, including, but not limited to algebraic expressions, names, strings, and functions.

BRIEF DESCRIPTION OF THE DRAWINGS

The features and advantages of the present invention will be more readily appreciated as the same become better understood when taken in conjunction with the following drawings, wherein.

DETAILED DESCRIPTION OF THE INVENTION

Example embodiments of the present invention provide software design and development tools in a computer system that, in one embodiment, enable real-time viewing and managing of data in disparate databases. Data management functions can include, but are not limited to, managing events, providing calculations, and enabling updates, inserts, and deletes on aggregate views. In another embodiment, the tools of the present invention create and use a uniform interface to existing components, such as objects and databases, to manage each component's attributes, data, behavior, and relationships. The uniform interface provides a homogeneous programming abstraction to potentially heterogeneous software components, regardless of their internal and external models, thereby enabling the integration of independently developed software components into a single solution.

Representative embodiments of the invention will now be discussed in more detail, beginning with a description of a join engine for use with databases and followed by a description of adaptive object modeling using uniform interfaces. The corresponding provisional patent application filed by applicant, No. 60/261,119, along with its accompanying Appendix A, are incorporated herein by reference in their entirety in this application. Appendix A includes the source code for building uniform interfaces in accordance with the method of the invention and for building, in particular, a join engine interface.

Join Engine Description

A Join Engine is provided that simplifies the development and improves the performance of applications that interface to normalized relational databases. Database normalization is the process of deconstructing a class with many attributes into many classes, each with fewer attributes in order to eliminate redundant data and to avoid problems with inserting, updating, or deleting data. The main advantage of normalization, is defining a model that is not dependent on any single application.

In relational database terms, a view is a virtual table that joins fields from one or more data tables.

In relational databases a clear distinction is made between the base tables and view tables.

A base table is a "real" table, i.e., a table that physically exists in the sense that there physically exists stored records that directly represent that table.

By contrast, a view is a "virtual" table, i.e., a table, composed of records from other "real" tables, that does not actually exist in physical storage but is rendered to look like a "real" table. Views can be thought of as different way of looking at the "real" tables.

The conventional wisdom is that Joins will severely degrade the performance of a relational database especially as the number of tables involved in the Join increases beyond 5 or more. The recommended way to overcome this problem is to implement the physical database as a de-normalized set of tables. The problem with this approach is that we then discard one of the major advantages of a relational database:

Any de-normalized set of tables will be tailored to support the needs of particular set of applications.

The de-normalized tables will have redundant data, along with the associated problems of consistently updating this data.

Another set of applications will require a completely different set of de-normalized tables.

This second set of de-normalized tables will have more redundant data, along with the associated problems of consistently updating this data.

Figure 1:
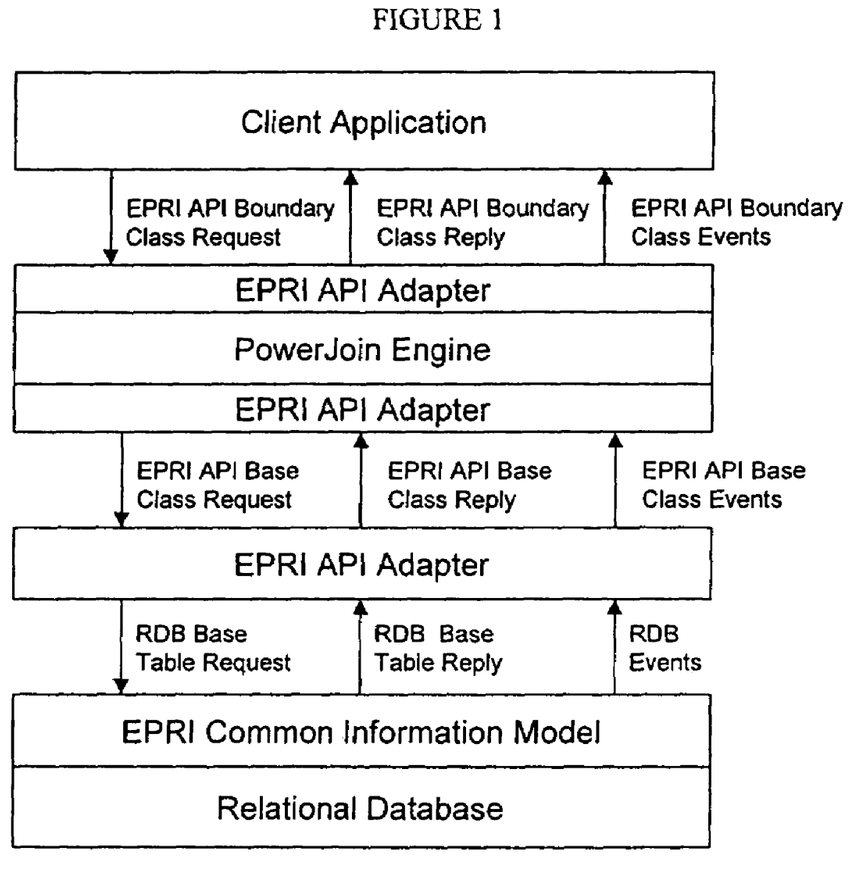
FIG. 1 is a diagram illustrating the interface of a client to a relational database using one embodiment of a join in accordance with the present invention.

An example Join Engine works with a relational database as shown in FIG. 1. With the Join Engine the programmer can create views that join together attributes from multiple RDB base tables. This feature is very similar to the query capability in standard relational databases. However, the Join Engine supports some unique features that are very valuable for building real-time systems.

The Join Engine supports updates against the view tables. The Join Engine performs all the required updates on multiple base tables when a client updates a single view table.

The Join Engine also supports create object and delete object operations on the view tables. The programmer defines the create object operations that are required on base table for each create object operation on the view table.

The Join Engine also maps events in the base tables to events in the views. Applications can register for events on the view tables. The view table may join attributes from multiple base tables and the view table may restrict the number objects in the view. A client will receive a call back only if data in its current view is changed.

The following example describes the Join engine as it has been implemented with the Electric Power Research Institute (EPRI) API. It is to be understood, however, that the disclosed embodiments of the invention may be implemented with other API's, including any API that externalizes a view of data stored in a relational database. In this example, the Join Engine maps the EPRI API calls that access the views to calls that access the base tables in a relational database.

Caching and bulk read and write access to the base tables is used to enhance performance.

EPRI API Source Code Libraries

The objective of the EPRI API Source Code libraries is to provide application developers, infrastructure developers, system integrators, and end users with a head start in building EPRI API adapters for a wide variety of different data sources and middle-ware products.

The objective of the EPRI API is to provide a precisely defined programming interface so that a client component can interact with a server component. The EPRI API defines method invocations and event notifications. Programmers can use these operations to define the dynamic behavior of the system. These operations determine how the system moves from one state to the next.

The EPRI API is defined to meet the requirements that are encountered in building mission critical, high availability, real-time Energy Management Systems and Distribution Management Systems.

The EPRI API encompasses:

Operations for Common Data Access including create, read, update, delete and fine grained notification of data changes.

Operations for Method Invocation. Methods can be invoked on applications (e.g., run program, stop program) as well as the individual objects that are modeled by an application (e.g., Trip Breaker).

Operations for Event Notifications. Event Notifications can be generated by applications (e.g., program aborted) as well as the individual objects that are modeled by an application (e.g., Transformer Overload Detected).

The EPRI API can be layered to work with different middle-ware solutions including CORBA, DCOM and JAVA JMS as well as different relational databases including Oracle, SQL Server and PowerData. The function signatures for the client are identical for all the different environments.

The EPRI API supports integrating closely coupled EMS applications with stringent real-time performance requirements as well as more loosely coupled applications and systems that operate downstream from an EMS.

The EPRI API supports the request-reply processing communication style that is typical for client server databases. A client requests information from a Data Source The client waits until the Data Source replies with a response. This is a synchronous or "pull" model of communication.

The EPRI API also supports event driven or asynchronous or "push" models of communications. The client registers for a call back when a Data Source event occurs. Upon receiving the call back, the client can query the Data Source for additional information. This event driven feature is critical for real-time systems. If this feature is not available the clients have to constantly poll the Data Source asking if there have been any changes. This provides an excessive load on the Data Source server and the network if the response times are to be kept small.

The EPRI API Source Code Libraries meet the needs four several groups of users, including:

Developers of EPRI API clients (power system specific components)—Developers of EPRI API clients need to build their software so that it can plug into different EPRI API infrastructure products. They can use the EPRI API Source Code Libraries to build their own development and test environments.

Developers of infrastructure that implements the EPRI API—These developers can use EPRI API Source Code Libraries as an interface to a generic set of infrastructure services. The infrastructure developers can be database suppliers, middle-ware suppliers and companies that have historically provided custom integration services.

System integrators—System integrators can apply the EPRI API Source Code Libraries to integrate existing legacy or new systems together for the exchange of information in a standard way. They can interface the EPRI API Source Code Libraries to existing middle-ware products that are often times dictated by corporate standards.

End users—End users can employ the EPRI API Source Code Libraries as a method of interconnecting legacy applications and systems with new applications and systems. They can add or replace systems without impacting other systems already in place and they can minimize the maintenance and training required for managing the interconnection infrastructure.

The EPRI API Source Code libraries can include the following class hierarchy:

CDS

CDSBaseAdapter

OracleCDS

The CDSBaseAdapter class is designed to act as a base starting point for new CDS derivative classes. One such derivative is the OracleCDS, which can be a base table wrapper for Oracle databases, as described in more detail below.

Features of the CDSBaseAdapter class include the ability to define its properties and resources on the fly with all storage based in RAM. It handles the majority of the CDS API calls in a logical fashion with respect to the RAM model created and is readily extendable so that this information can be tied into an alternate data store such as an existing database.

The implementation of the CDSBaseAdapter Class can use existing subroutines and classes. These subroutines and classes will be derived from AST Tools and the existing CDS classes. The exact classes and subroutines to be reused will be determined during the detailed software design.

AST Tools

The ASTTools C++ classes are designed primarily to simplify common coding tasks. The most commonly used functions are summarized below.

DynamicArray—a template for managing an array of any type that automatically grows to any size. This class relieves the programmer from any concern about how big an array is.

GenDB—creates a named object collection of any size and stores them for fast retrieval in a sorted list using a binary search for retrieval.

Hashtable—creates a named object collection of any size and stores them in a hash table for retrieval.

ObjectPointerArray—a template for managing a dynamic list of objects that are automatically allocated and deallocated as needed. Similar to DynamicArray, but is smart enough to create and destroy objects.

Varconf—a set of utilities for processing configuration files and command lines.

String—a class for implementing a string abstraction in C++. C and C++ don't really have a string data type, they use an array of bytes terminated by zero to represent a string. This class allows operations such as concatenation, automatic memory allocation, assignment, comparison operators, etc.

Btree—a binary tree storage facility (not a class)
Linklist—implements a linked list.
FIFO—implements a first in first out queue (not a class)
Expression—implements an expression engine class
Logger—implements logging facilities
Hexdump—dumps data buffers in a hex format . . . mostly used for debugging.

ObjectRef—implements a template for smart pointers. Smart pointers automatically clean up pointers once they aren't needed anymore.

Parse—implements a powerful parsing engine for breaking apart strings (not a class).

VarManager—implements a variable tracking and substitution class with hierarchical name spaces.

CDS Class Libraries

Embodiments of the present invention provide CDS (Common Data Source) class libraries for interfacing applications to a variety of different data sources.

The class libraries can be designed using object oriented programming (OOP) techniques. In particular the CDS class libraries take advantage of an OOP technique known as polymorphism. Polymorphism is when the same method or operator can be used on different types of objects. A real-world example is giving the command "Start your engines" to the drivers of a boat, a plane and an automobile. The same command is implemented in three very different ways.

By using polymorphism, a user application can invoke the same commands to read and write data from and to an abstract data source and different subclasses can implement these commands with different physical data sources. An abstract CDS class is used as the conduit for the subclasses.

An abstract method is not actually implemented in the abstract class. It is merely declared there. The body of the method is then implemented in sub-classes of that class. Subclasses are provided for the different physical data sources e.g., base tables, Join Engine view tables, and object data and a memory resident cache.

The CDS classes can include the following:

---

CDSFactory (Abstract class for creating an instance of CDS)
    PDCdsFactory (Creates a PowerData CDS instance)
        CDSJNIFactory (Creates a PowerData JAVA CDS)
    PVCDSFactory (Creates a PowerVisuals CDS instance)
CDSMethodHandler (Abstract class for defining events and methods)
CDS (Abstract class for specific CDS implementations)
    PDTableDS
    VJoinDS
    PVDS (Provides access to PowerVisuals object data)
    PDCDS
        JoinCDS (Provides access to the Join engine)
        PDExpressionCDS (Provides access to mathematical calculations)
        PDTableCDS (Provides access to PowerData base tables)
        SimpleCDS (Provides access to memory resident tables)
CDSException (Class for reporting exceptions)
CDSDataCvt (Class for data type conversions)

---

XML Data Exchange

The XML Data Exchange Program enables a user to:

Export an XML file from a Common Data Source that is layered with the EPRI API.

Import an XML file into a Common Data Source that is layered with the EPRI API.

Figure 2:
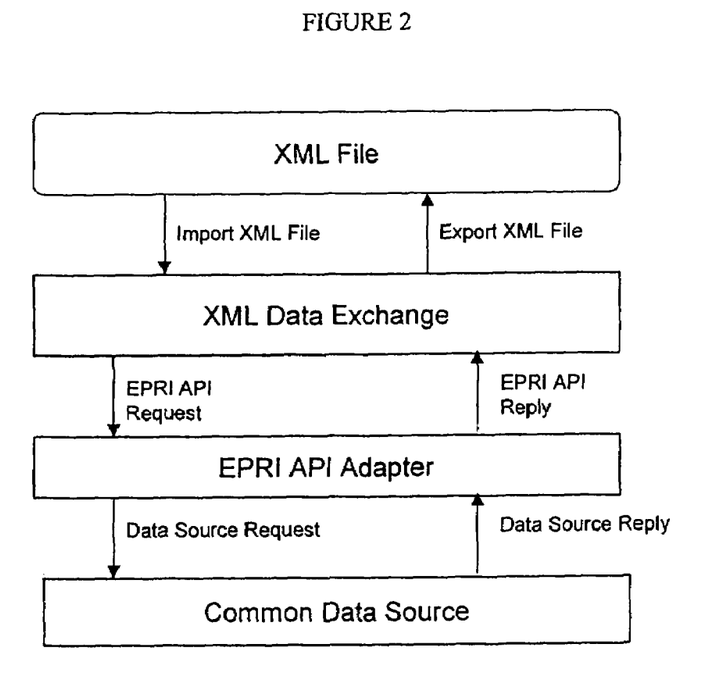
FIG. 2 is a diagram illustrating the interface of an XML Data Exchange Program to a Common Data Source.

The XML Data Exchange Program is designed to work with the different data sources that support the EPRI Application Program Interface as shown in FIG. 2.

By defining the functionality of the XML Data Exchange program in an abstract manner the result is a general purpose utility program that can used in a very wide range of specific applications. These applications may include examples such as:

Exchanging network operational models
    Exchanging transmission and generation outage schedules
    Archiving and restoring save cases for network applications
    Exchanging customer outage reports The XML Data Exchange Program can use RDF and RDF Schema for specifying the data model.

Oracle EPRI API Adapter

Figure 3:
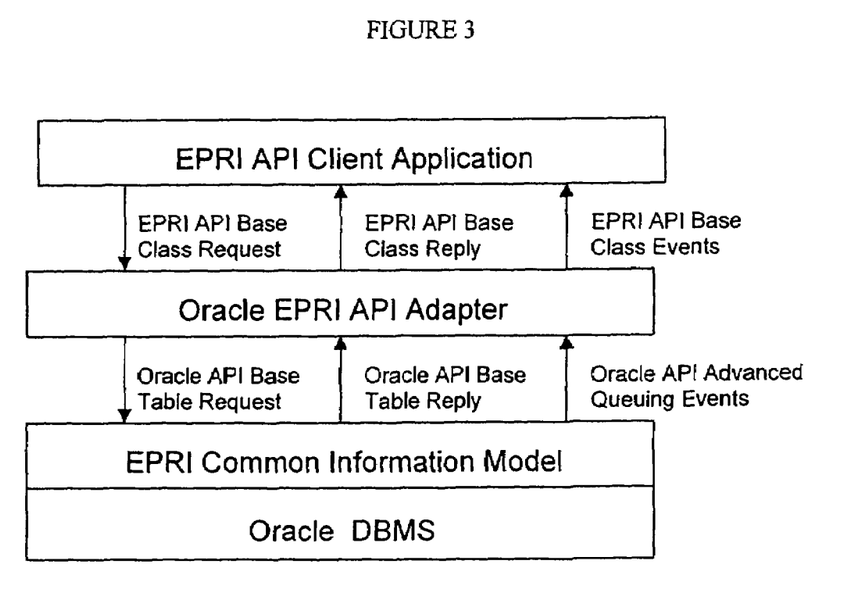
FIG. 3 is a diagram illustrating the direct interface to an Oracle DBMS.
Figure 4:
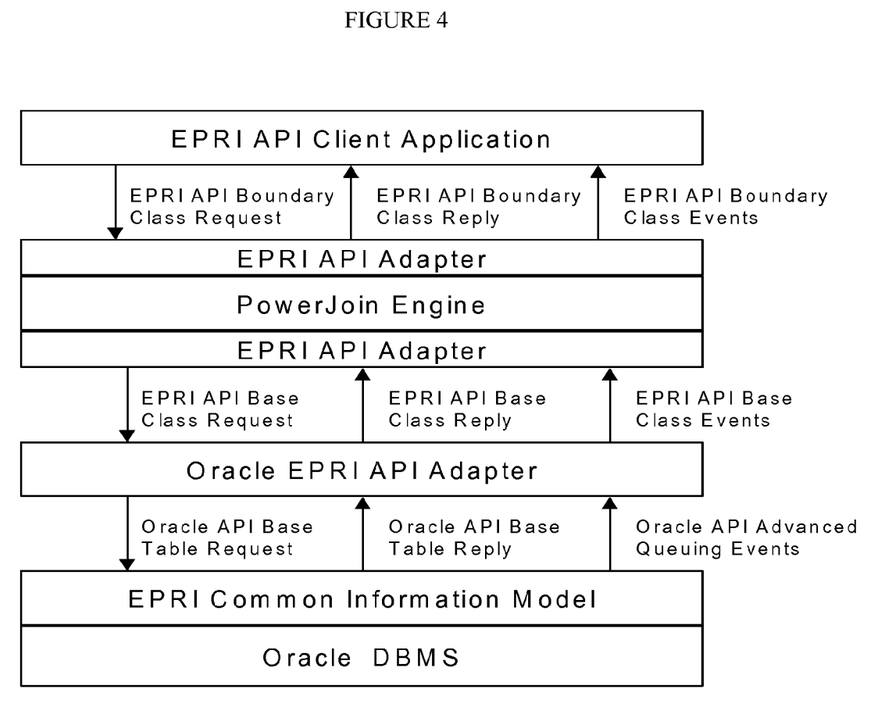
FIG. 4 is a diagram illustrating interfacing a client application to Oracle using the join engine of the present invention.

A representative embodiment of an adaptor is the Oracle EPRI API Adapter described below. The Adaptor is the layer of software that allows an application written with the EPRI API function calls to interface to an Oracle database. A client application can interface directly to the Oracle database as shown in FIG. 3. Alternatively, a client application can interface to Oracle via the Join Engine as shown in FIG. 4.

The Oracle EPRI API Adapter translates the EPRI API function calls into Oracle C++ calls. The adapter is built by implementing specific sub-classes for the abstract classes in the EPRI API Source Code Libraries.

The EPRI API operations that can be supported by the Oracle 7 implementation include the following:

Operations for Common Data Access including create, read, update and delete.

Operations to determine EPRI API services supported by the Oracle 7 data source.

The EPRI API operations that can be supported by the Oracle 8 implementation include the following:

Operations for Common Data Access including create, read, update and delete.

Operations to determine EPRI API services supported by the Oracle 8 data source.

Operations for asynchronous notification to clients on occurrence of database events.

What follows next is a description of a representative embodiment of a PDExpressionCDS join engine.

PDExpressionCDS

The objective of the PDExpressionCDS join engine is to provide an abstraction layer where data that is spread across multiple locations, such as data in a normalized database, can be presented to the user as views. It uses the EPRI API as its programming interface and as a result can be combined with other EPRI API based components as needed. The implementation of this abstraction requires the solution of several complex programming problems, such as performing joins between sets of data while managing events, providing calculations, and enabling updates, inserts, and deletes on views. Preferably, this is done in a manner that doesn't introduce significant overhead or processing delays.

The PDExpressionCDS join engine accomplishes these goals. Applications can generally be written without concern as to the physical location or format of the data itself. Instead, the application can assume any set of logical objects that it desires. Each set of logical entities is known as a CDS or Common Data Source. One CDS can be thought of as a table from the relational database point of view, or as a set of objects from the object oriented point of view. Using this interface, the application developer can define their problem in terms of data that makes sense to their application. The data manipulation is done by the CDS engine, in this case the PDExpression-CDS.

This provides a powerful abstraction layer where the application is completely protected from changes in the location, format, or facility used to managed the underlying data.

The PDExpressionCDS join engine is driven through one or more join definition files. Each definition file is a plain ASCII file consisting of a number of sections delimited by brackets in the form of [SECTION_NAME].

The join file is specified as a required part of the PDExpressionCDS definition string. The format is: "PDExpressionCDS:definitionFile=filename"

An optional parameter of definitionFilePath may also be used. If this is specified then the definitionFile parameter only references the file name and doesn't specify the path. The filename is the name of a file that follows the formatting and content described here.

Each section has a section-specific set of attributes that are set using the general form of:

attribute_name=value;

The use of the semi-colon at the end of each attribute statement is required. A summary of the sections and attributes is as follows:

```
[POWERDATA]
Type =database_type;
Parms =database_parms;
CacheType =cache_database_type;
CacheParms =cache_database_parms;
CacheName =cache_table_name;
[TABLE]
Name =table_name;
Alias =short_name;
Restriction =expression;
Unique =true | false;
[CDS]
Definition =cds_definition;
Alias =short_name;
[JOIN]
Table1 =alias1.join_column_name;
Table2 =alias2.join_column_name;
OuterJoin =true | false;
[ENUM]
Name =enumeration_name;
Keys =0,1,2,3;
Values =name,for,each,key;
[COLUMN]
Name =column_name;
Value =value_expression;
Update =alias.column_to_update;
Width =column_output_width;
Required =true | false;
PK =true | false;
[INSERT]
setFactoryVariable ("VARNAME",value);
cds =getCDS("cds_definition",cache);
req_prop =cds.getResourceRequiredProperties( );
cds =cds.addResource(req_prop);
cds =cds.getValue("prop_name",res_id);
cds.setValue ("property_name",res_id,value);
return (pk);
```

Section Descriptions

Each section found in a definition file is described below. Some sections appear only one time while others may be repeated as many times as needed, such as the [COLUMN] section which is repeated once for each column.

[POWERDATA]

The POWERDATA section is used to designate the database settings for use with a PowerData database. This section is required if TABLE sections are used, otherwise it is ignored. This section also allows a join cache to be specified. The join cache is used to store the linkages between tables persistently so that the join can be recreated with very little computation. When used, the join engine first checks to see if the data in the join columns has changed, if not the persistent linkages are used, otherwise the join is recalculated. The attributes that may be specified in the POWERDATA section are:

Type—Defines the PowerData database type where the tables will be accessed from, which is preferably one of:

| | |
|---|---|
| PM_Shm = | shared memory database |
| PM_Local = | file based database |
| PM_Net = | network based database |

Parms—Defines the parameters needed by the specified database type. The parameters expected for each type are:

| | |
|---|---|
| PM_Shm = | shared memory key, i.e., 10 |
| PM_Local = | database file name, i.e., database.pdc |
| PM_Net = | host and port for network connection, i.e., pdserver:2200 |

CacheName—This defines the name of the cache to use for this join. If this is not specified then caching is not used. If it is specified then a table with this name will be created to cache the join linkages. It is important to make sure that this name is unique among all the joins being used. If two joins share the same name then the cache will not be used effectively. It is also possible, but very rare, that the join will be created incorrectly as a result of two joins using the same cache name.

CacheType—Defines the PowerData database type for the cache. If this is not specified then the database type for the cache will be the same as the database type for accessing the tables. See Type for a description of the different database types.

CacheParms—Defines the parameters needed by the specified cache database type. See Parms for a description of the database parameters used by each database type.

[TABLE]

The TABLE section is repeated for each table that should be included in the join. Each table is assigned an alias that is used to reference it in other sections. A table may be assigned multiple aliases where each alias represents a different logical copy of the table.

This is useful in cases where the same table is used multiple times for different purposes within a single join. If the same table is being used but with different restrictions for each instance then each instance should have it's own TABLE section. If in doubt, create multiple TABLE sections.

The attributes for the TABLE section are:

Name—Specifies the name of the table in the database.

Alias—Specifies an alternate name for the table, usually shorter, that is used to reference this table in other sections in the join file. At least one alias is required since the table name is not usable in place of an alias. Multiple aliases can be assigned to the same table.

Restriction—Specifies a restriction to use to limit the number of visible records in the table. A restriction is created by comparing column names to each other or to constants.

Column names are written in the form of 'column_name'. Strings are written in the form of "string". Floating point numbers or integers are written as simple constants. Comparisons can use any of the following:

| | |
|---|---|
| < | = less than |
| > | = greater than |
| <= | = less than or equal |
| >= | = greater than or equal |
| == | = equal |
| != | = not equal |
| LIKE | = match a pattern where % is equal to any number of characters and . is equal to any single character |
| NOT LIKE | = opposite of LIKE |

These sections can be connected using a logical and '&&' or a logical or '||'. Precedence can be specified using '(' and ')'.

[CDS]

The CDS section is used as an alternative to the TABLE section.

The attributes used by the CDS section are:

Definition—The CDS definition. This is a string that defines a CDS type and its parameters.

Alias—The short name used to reference this CDS in the other sections. Multiple aliases can be specified for a single CDS.

Unique—This has the value of true or false. It is false by default meaning that duplicate values are OK. If set to true then duplicate values are removed.

[JOIN]

The JOIN sections specify the way the tables or CDS's are connected together. Each JOIN section specifies a linkage between two tables in the form of alias.attribute. The alias is defined in either the TABLE or CDS section. The attribute is the name of an existing integer attribute. Multiple JOIN sections are specified, each describing a single linkage, until all of the linkages are defined.

Generally speaking, the joins can be specified in any order, however, there is one rule that is preferably followed. Except for the first JOIN, each join should specify the Table2 attribute using an alias name that was used in a previous JOIN section.

The attributes for the JOIN section are:

Table1—The first table or CDS alias and attribute in the form of alias.attribute.

Table2—The second table or CDS alias and attribute in the form of alias.attribute. The alias specified here was used in a previous JOIN section unless this is the first one.

OuterJoin—Has the value of true or false. If set to true then this will be considered an outer join. That means rows from Table2 that do not match any row in Table1 will not be removed. The default action is to remove those rows.

[ENUM]

The ENUM sections are used to define enumerated values. This is helpful when numeric values are used internally by the database that are not clear to the end user. Enumerations can be used to convert these integers into strings.

Enumerations are converted using the enum( ) function which is described in the expression section. As many ENUM sections can be defined as are needed. The attributes for the ENUM section are:

Name—Specifies the name of the enumeration.

Keys—Specifies a comma separated list of integer values.

Values—Specifies a comma separated list of strings that correspond to the integer values.

[COLUMN]

The COLUMN sections are used to describe each column (sometimes called an attribute) that the join will represent. Columns can be created from any alias.attribute combination or from an expression (described below).

The attributes for the COLUMN section are:

Name—Specifies the name of the column. This is the name the column will appear to have to any user of this join.

Value—Specifies an expression that represents the value of this column. This can be the result of any set of supported operations (which are described below) or it can simply be an alias.attribute combination.

Update—Specifies the alias.attribute to update when data entry is performed. If this is not specified the column is not enterable.

Width—Specifies the width of this column in characters. This is used for formatting output.

Required—Has the value of either true or false (the default is false). Specifies if this column is required for adding a new object.

PK—Has the value of either true or false (the default is false). Specifies if this column represents the primary key column. This is used to help the CDS interface know if there is a unique way to identify each resource (row) in the CDS.

[INSERT]

The INSERT section is only specified once. It defines all of the logic necessary to add a new resource (row) to the underlying tables. This section works differently than the others in that each entry is a macro function call used to manipulate other CDS's.

The insert section can be thought of as a procedure that is run each time an insert is performed on the CDS defined by this file. The caller should have already asked for the required properties and filled them in with appropriate values. Then they pass that CDS into the addResource( ) function call to add the new resource.

The CDS they pass in is available in the INSERT section as a CDS variable named _required. Once this happens control is passed to the INSERT section where all of the steps needed to insert the new logical object into the database should be implemented. In a normalized database this can require many different insert and lookup operations.

All data inside the INSERT section is managed in the form of CDS's. Variables to hold the CDS's are created implicitly and do not need to be declared. As a result, simply supplying any valid variable name to hold the return value from a function call will work.

In general an insert section performs two basic operations:

Add Records—Records are added to lower-level CDS's. In fact, in some cases the entire insert operation is delegated to a lower level CDS.

Adjust References—Many times the new records need to have foreign key references adjusted. This is done by performing a lookup through another CDS and using that data to update the new record. When per-forming lookups it is assumed that all required data has already be entered into the underlying database.

These operations are implemented using the following script function calls:

setFactoryVariable("variableName", value);

This function is used to load variables and their values into the factory before retrieving a CDS. This allows variables to be resolved in the underlying CDS based on the current information from the _required CDS. The parameter variableName is the name of the variable being defined and the value is the value it will be set to.

cdsvar=getCDS("cds_definition",cache);

This function opens up a CDS. The resulting CDS can be used to insert new records into or to provide reference information for linkages to other CDS's. The cdsvar is a variable by any name that is used to reference the resulting CDS. The cds_definition is the CDS definition string and is dependent on the type of CDS being opened. Each type of CDS expects particular parameters to be supplied. The cache parameter is the value true or false and indicates if this CDS should be cached. If the same exact CDS will be opened often then caching is usually a good idea.

req_prop=cdsvar.getResourceRequiredProperties( );

This function returns the required properties needed to insert a new resource (row). The req_prop variable can be a variable by any name and is used to reference the returned CDS. The cdsvar variable is any CDS variable previously defined.

newcds=cdsvar.addResource(req_prop);

This function inserts a new resource (row) into an already opened CDS which is referenced by cdsvar. The parameter req_prop defines the required properties that are needed to add the new resource. The return value is a CDS with a single resource that is referenced by the variable newcds. The newcds can be used to access or set properties in the new resource. All references will be at resource id 0 since the new CDS only has a single resource.

cdsvar.getValue("prop_name",res_id);

This function is used to retrieve data from a CDS. It is usually used directly as a parameter to set-Value to set an attribute in a new CDS based on the value of an existing CDS. The cdsvar variable is a reference to the CDS from which the value is to be retreived, the prop_name is the name of the property to fetch the data from and the res_id is the offset or id of the resource (row) to fetch the data from.

cdsvar.setValue("prop_name",res_id,value);

This function sets the value of a property within a CDS. The cdsvar variable is a reference to the CDS to set the value in, the prop_name is the property to change, res_id is the offset or id of the resource (row) to update and value is either a constant or a call to getValue in another CDS.

return(pk);

This function is always the last function in the INSERT section. It is used to terminate the procedure and to designate a key value to be used as representative of the new resource that was created.

The variable pk variable is usually the result of a previous addResource call.

Expressions

Expressions provide a way to produce calculated values as well as just the data from the database. They support direct references, mathematical expressions, functions, and conditionals.

Attribute References

Attribute References refer to the direct access of data through the alias.attribute combination. The alias portion of this should have been defined in the [TABLE] or [CDS] sections. The attribute is a column name that exists for that table or CDS. This format is used to access all of the underlying information within the database.

Mathematical Expressions

Most of the basic mathematical operators are supported as defined below:

+ addition
− subtraction
* multiplication
/ division
^ raise to the power of
% remainder
~ unary minus
& bitwise and
| bitwise or Also note that the unary minus is a tilde ('~') symbol rather than the usual dash ('-'). Logical operators are also available as described in the Conditionals section. If used directly they evaluate to either a 1 (one) or 0 (zero).

Functions

A variety of functions are also available as described below:

enum(enum_name,expression)

Returns a string from the enumeration enum_name. This enumeration should have already been defined in the [ENUM] section. The expression should evaluate to one of the integer values defined in the enumeration.

format("format_template"[,expression . . . ])

Returns a string formatted according to the format_template. The template follows the same rules used by the printf (3) C function. Each replaceable element in the format_template should have a corresponding expression. There can be as many expression elements as needed, all separated by commas.

is Null(alias.attribute)

Returns true or 1 if the specified attribute value is NULL, otherwise false or 0 is returned.

max("cds_def",attr)

Returns the maximum value in attribute attr for the CDS defined by cds_def.

sqrt(x)

Returns the square root of x.

strlen(x)

Returns the length of string x.

strtok(string, "delimiters", n)

Returns token n (where n is zero based) from string string where tokens are separated by any of the characters in the string delimiters.

trunc(string,width)

Returns the string string truncated to width characters.

Conditionals

Conditional operations are supported in the 'C' style form of:

(logical_expression)?value_if_true:value_if_false

These expressions can be nested as deep as necessary. The logical operators supported are:

! not
|| or
&& and
== equal
!= not equal
< less than
<= less than or equal
> greater than
>= greater than or equal Variable Substitutions Variables can be used to allow a single join definition file to be used in different ways. For example, the join may specify a restriction based on a name in the [TABLE] section. If this name is hard-coded the join file is only useful for that specific name. An alternative is to use a variable to contain the name. A variable is defined using the form ${VARNAME}. It can be used anywhere that an expression is used or it can be part of an expression. Default initial values can also be supplied so that the join behaves normally even if the variable isn't defined by the caller. Variables with defaults are defined using the form ${VAR-NAME=default}, where default is any constant.

Values for variables are set by the caller using either the CDS definition string or the factory. An example of using the CDS definition string to set the value of a variable called NAME would be:

"PDExpressionCDS:definitionFile=./sample.txt, NAME=Test"

Appendix A includes a source code listing for a Join Engine comprising the following files:

.c—C files
.h—C header files
.cpp—C++ files
.hpp—C++ header files
.java—Java files
.m4—M4 macro files
.pde—Join configuration files
.txt—More join configuration files
.pdx—PowerData Database export files
.sql—Database schema definition files
.cfg—Configuration files
.csv—Comma separated value data file
.xml—XML configuration file The Join Engine is but one component of a system that can be developed using the tools of the present invention for generating reusable components using a uniform calling interface. Set forth below is a description of a design and development process that uses tools described therein, including the Join Engine, operating through a uniform interface on existing components to creating a single integrated reusable component. The existing components need not share the same object abstractions because the uniform calling interface adapts to the abstractions externalized by the various components.

Introduction

Adaptive Object Modeling using Uniform Interfaces (AOM/UI) is a software design and development process that significantly reduces the cost for designing, developing, deploying and maintaining software systems by using a unique approach to object abstraction.

From the AOM/UI perspective, any automated system is a collection of components that each perform a specific business function. These can be as small as a single procedure or as large as a major subsystem. Collectively these components provide all of the functionality needed for a specific automated solution. This is an iterative concept because any automated solution may be considered a component in a larger automated system.

In order to function as a single integrated solution these components should communicate with each other in a very precise and predicable manner. It is the way in which this communication is done that is at the heart of so many software system problems and is exactly the problem that AOM/UI addresses.

The AOM/UI Approach

Objects Adapt to the Component

The AOM/UI approach allows each component to assume its internal object abstractions are the standard ones. As a result, the component doesn't adapt to the object's implementation, the objects adapt to the component's implementation.

The result is a simplified component where the implementation is focused on the business logic implemented in terms of the ideal object abstractions. There is also no need for coordination between component developers since each component can use it's own object abstractions regardless of what other components are using.

This adaptive capability is a unique concept since conventional wisdom would say that the object model is the part of the equation that should be kept constant. It is also very difficult to do unless tools can be used to assist with the adaptation.

Uniform Interfaces

The tools require that the objects all be implemented with a uniform object interface. Having a uniform interface does not mean that each object has uniformity in terms of what it represents, only that the calling interface is uniform.

Having a uniform calling interface is a similar concept to a relational database engine. A relational database can be set up to store information on just about anything, however, the calling interface used by application developers is always the same, regardless of the specific information being managed.

In the AOM/UI methodology all objects are modeled the same, regardless of what they represent. Each object has attributes, behavior and relationships.

Object Interface Requirements

A programming interface is used that allows at least the following interactions with each abstracted object:
   read an attribute
   write an attribute
   get the object attribute names
   invoke behavior
   implement behavior
   get related objects
   get an object set A full scale implementation would most likely enhance these operations to include specific attribute data types, object identification and other convenient operations to make the interface more complete. However, it is important that the interface stay as compact as possible and uniform across all objects. This means there can not be any extensions to the interface based on the object being abstracted. As long as that rule is met the interface can be as robust as needed.

In addition, the interface should also allow objects to be managed in sets. These sets should be defined in an opaque manner, not by queries that are coded into the application. This is important because any query mechanisms would necessarily introduce assumptions and dependencies about how the objects are stored and organized, when in fact the application should not be aware of this or much of the critical abstraction between the logical view and actual object implementation is lost.

Describing Object Sets

To address this problem, a set of objects is defined uniquely by a complex name which is similar in concept to a URL. The complex name is provided to the component during run time or through a configuration mechanism and can be exchanged for the actual set of objects it represents by using the uniform object interface.

Abstraction Conversion Tools

Once this uniformity is established, tools can be used to assist with creating the derived abstractions needed by each component. The tools implement a set of operations that allow attributes and behavior from objects presented in one abstraction to be part of objects presented in another. They can the thought of as abstraction conversion tools that implement operations that include, but are not limited to, the following:

Object masquerading—this is the ability to change the names of attributes or behavior Object selection—this is the ability to reduce the number of objects in a set Object projection—this is the ability to reduce the number of attributes or behaviors available on an object Object concatenation—this is the ability to combine sets of like objects together to form a single set Object joins—this allows the creation of derived objects based on relationships between existing objects Property calculations—this is the ability to create calculated properties for an object Object bridging—this is the ability to utilize a communications system (any middleware, messaging or networking technology) to make objects available across different physical machines Object monitors—wrappers that provide security, logging, journaling or other services that are transparent to the object implementation System wrappers—wrappers that take information and functionality from existing systems and make it available through this interface. For example, this could be used to provide access to an Oracle database or an existing proprietary system.

Closure

These operations can be chained together as needed since the input to any operation is one or more AOM/UI objects and the output is always a AOM/UI object. This means that they implement closure, allowing a great deal of flexibility in how the operations are used to gain the exact object abstractions needed.

Object Behavior

Components that implement objects should provide the following behaviors as a minimum when ever possible:

Attribute change notification—this informs an interested component each time an attribute changes value Attribute addition notification—this informs an interested component each time an object adds an attribute Attribute removal notification—this informs an interested component each time an object removes an attribute Object addition notification—this informs an interested component each time an object is added to a set Object removal notification—this informs an interested component each time an object is removed from a set Other behavior can also be provided as needed. The system allows for any type of custom behavior to be provided as is necessary. Like the attributes, these behaviors can be abstracted to allow complete independence between components.

This means that the behavior implementor may have a different name and different parameters than the caller is using. These mis-matches are resolved using the abstraction conversion tools.

Checking for Behavior at Run-Time

Components can check to see if which behaviors exist, allowing the component to modify its processing based on the object's capabilities. This addresses the situation where the ideal case can be utilized when possible, however, any object can be processed even if it's implementation is more primitive (less functional).

Relational Modeling

The last piece of the AOM/UI puzzle is the relational object model. The relational object model is not required and in fact would be overkill in a simple system, however, if implemented it ensures the ability for the system to grow as large as necessary and reduces the complexity that would otherwise be introduced as components from different domains are integrated together.

The relational object model is a normalized representation of the core entities that make up the system. It is not required for any component to utilize this model directly, only that all views used by the components can be derived from it. As new components are added the relational object model can be expanded to encompass the normalized forms of the new objects and attributes that they define.

This relational model helps manage the complexity because it defines clearly how to start from a view in one domain and cross over to another. For example, how a customer relates to a credit in the accounting system. These are two views of two objects that have a relationship due to a sale, but without good data modeling these relationships would be difficult to manage.

Benefits

The AOM/UI approach offers the following benefits:

Components are built around the object model that suites them the best.

Components can be built independently without requiring communication between groups.

The system can be scaled without limitation.

Integration technologies can be applied as needed without requiring any modification to the workings of the components themselves.

The system is not limited by location, platform or language.

EXAMPLE

Developers of complex systems are faced with a very difficult dilemma every time they set out to solve a problem: How can existing tools and technologies be best utilized to arrive at the most effective implementation of the solution. Picking the wrong approach at this critical juncture could mean the difference between a solution that stands the test of time and one that simply gets forgotten as technology evolves. It can also mean the difference between a solution that can be reused in a variety of situations or a solution that exists primarily stand-alone.

Traditionally this has been a very difficult decision process to go through, requiring considerations of which database, which operating system, which hardware, what kind of middleware, and what type of user interface. It is at this point that the solution to the problem being solved starts to be imbedded into a specific set of technology, eventually becoming indistinguishable from that technology. Each assumption made at this stage becomes a dependency, each dependency becomes a barrier that limits deployment, hinders future integration, creates potential maintenance, and devalues the resulting solution. In addition, the solution ages and grows out of date as the technology it depends on grows out of date, regardless of the robustness and the applicability of the algorithm itself.

Having dependencies of this type are often viewed as such a severe constraint that many researchers and vendors choose to build their own environment as well as their own applications. This too has pitfalls. A complete and mature set of infrastructure is very expensive and time consuming to build. It can tie up valuable resources and forces developers to become experts in many areas when their passion is really focused in a few specific areas. More often than not the result is a compromised set of infrastructure, built to the minimum specifications needed by the supported applications and not robust enough to allow the true potential of the primary work to be realized.

The following example presents an alternative approach, using abstract object modeling in accordance with one embodiment of the invention, that allows a developer to build applications that can take advantage of other technologies without depending on them. It allows applications to be combined in ways never imagined by their authors and it insulates the investment in the solution from the specific technologies available at the time of its implementation.

In order to illustrate this process we will examine the development for a linear powerflow application. First examining an implementation based on a more traditional approach, followed by an examination of that same implementation based on the abstract object modeling approach. It is important to remember that the linear powerflow application is chosen as an example because it provides an expedient illustration of these principles; however, any component in a system can be designed this way, including the user interface and database systems.

Powerflow Requirements

The linear powerflow application is expected to run continuously, reacting to any change in the system conditions by calculating the branch flows and angles. It will do this by examining each island in the system one at a time. If the island is energized, it will examine each bus in the island to find out the total load and total generation on that bus. Then each branch will be examined to find out the impedance and reactance. From this all the bus angles will be calculated along with the branch flows. These results will be stored in a way that they can be viewed and utilized by other applications.

One very common traditional approach is to use text files to pass the data in and out of the application. This is a convenient and appropriate approach in many situations, especially where batch oriented processing is acceptable. However, we are attempting to raise the level of integration for this example application so that it can immediately react to system changes and is able to process only the changes that it needs rather than starting over every time. This requires us to integrate the application more tightly and does not permit the text file approach.

Figure 5:
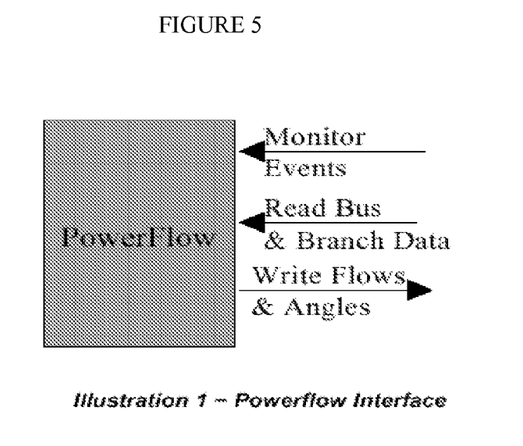
FIG. 5 is an illustration of a PowerFlow interface.

The resulting powerflow application has the basic interface as shown in FIG. 5.

Using a traditional approach, the powerflow application will need to integrate tightly with the system containing the real-time information. This will require the developer to answer some important questions:

What API is used to monitor for events?

What API is used to access the data?

How is the data formatted? How does it need to be altered before it can be used by the powerflow application?

Where should the results be stored?

How should the results be formatted to meet the needs of the data model?

Is a middleware used or is the access local?

What performance issues are there to worry about?

Figure 6:
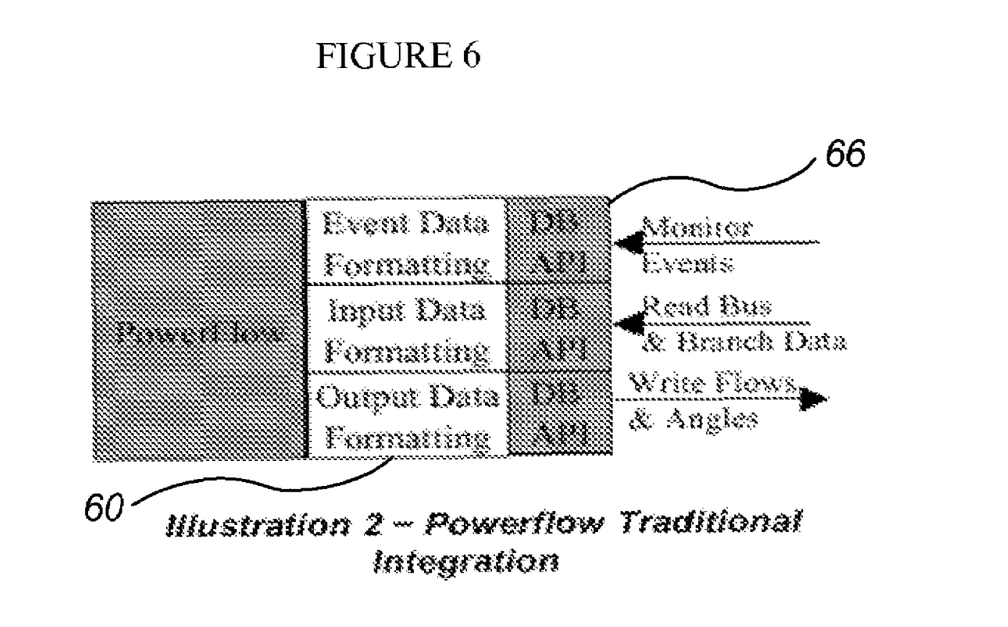
FIG. 6 is an illustration of a PowerFlow Traditional Integration.

The powerflow application from FIG. 5 is adapted according to the answers obtained above. The following diagram illustrates the general changes that are needed. The sections 60 will need to be maintained any time that the database model is changed. The sections 66 will need to be changed any time the data storage facility is changed, or if middleware is needed.

As FIG. 6 shows, this otherwise generic application is now integrated so that it will work with exactly one system. It is also very heavily dependent on any changes to that system, including data modeling, API and middleware, meaning that any changes to those underlying systems will also require maintenance to the application.

In addition, if the application needed to be integrated on another system using another model, the amount of integration work must all be repeated, there is no carryover benefit gained after the first integration. Since this integration effort is usually expensive and time consuming it is unlikely that others with different environments will reuse this application without a very compelling reason.

Abstract Object Modeling Approach

Abstract Object Modeling takes a different approach, it is based on the idea that the application developer can assume the application is interfacing to sets of virtual objects. These virtual objects can have any definition in terms of behavior and attributes that the developer chooses. What objects really exist in the system and where they exist is not really important and is resolved later.

This may sound rather extreme until one compares this approach to the already very popular practice of using text files for data exchange. It is not very unusual for an application to specify a file format for input, how that file is generated is of no consequence to the application, just as long as it meets the format requirements. The developer may also share results through one or more output files, the format of which is assumed by the application developer, again leaving unanswered how that output file will be blended into the overall operation of the system. As long as these files are clearly documented this is usually an acceptable practice.

Text files can also be very successful in representing a set of objects in a very simplified manner, just imagine a text file for specifying the busses for the powerflow application, which could be formatted as:

BusNumber,TotalLoad,TotalGen
1,100,0
2,0,100

This simple comma separated value file could be seen as a set of two bus objects. Of course, these bus objects don't have any behavior, only state. However, this is still a very useful representation.

It is also easy to imagine that this representation could be generated by tools from any system where a powerflow application was needed. In other words, it is perfectly reasonable for the developer to simply assume that these objects can be produced as specified without needing to know any detail about the target system ahead of time.

Another aspect of using text files is that nearly every computer language on any platform can read or write a text file that can be used by any other language on any other platform. This type of consistency is very important because it means that no special tools or facilities are being assumed by the developer that can become out of date or unavailable as the application is moved from system to system. There are other issues, such as 16 bit character sets versus 8 bit, but in general these practices work without any hitches.

Looking at this another way, the text file approach allows an application to use a simple, consistent API across any system from any language to represent any type of object. This is an interesting observation when compared to object oriented systems such as CORBA or COM where each class of object is expected to implement a different API.

Each class having its own API is quite informative when studying the interface, however, this creates a lack of consistency which prevents the construction of tools that filter, re-map and dynamically generate objects. Where systems constructed around a consistent API can do this quite naturally. This becomes a significant point that is a key component in the theory behind abstract object modeling. Using text files as an example of this principle, there are any number of generic tools and utilities that can filter, parse, read or write the bus objects stored in the simple comma separated value file that was presented above. The API for abstract object model based applications preserves this same principle.

In most respects text files seem like a viable answer to our plug and play interface. However, as useful as they are there are still significant limitations that make many implementations difficult, such as asynchronous events, shared access, locking, high-speed access, and lack of object behavior.

This is where the abstract object modeling approach helps take these concepts to another level. In much the same way that a text file can describe a set of virtual or abstract objects, the abstract object modeling API can as well. However, the abstract object modeling API goes much further, allowing access to individual attributes, creation and destruction of objects, event notification, introspection and access to behavior. These operations are all performed through an API that never changes regardless of the makeup of the objects.

The benefit is that the application can rely on only one API and assume one data model regardless of how and where it is being integrated. These logical views doesn't change, no matter what middleware, persistent storage system or data model is being used in the target system. Instead, these views are mapped to the target system during integration using tools and utilities that are external to the application.

When designing a system using abstract object modeling, the first step for the application developer is to define the sets of objects that will be required by the application. These are the only external objects that exist from the application's point of view. For the powerflow application, the classes Busses and Branches as described below:

TABLE 1

| Busses | | | | |
| --- | --- | --- | --- | --- |
| BusID | IslandID | TotalLoad | TotalGen | Angle |
| 1 | 1 | 100 | 0 | 0 |
| 2 | 1 | 0 | 100 | 0 |

The Busses class attributes are:
BusID. unique identifier for the bus
IslandID. island the bus belongs to
TotalLoad. all load on the bus
TotalGen. all generation into the bus
Angle. bus angle, output by powerflow

TABLE 2

| Branches | | | | |
| --- | --- | --- | --- | --- |
| BranchID | PBus | QBus | R | X | Flow |
| 1 | 1 | 2 | 0 | 0.1 | |

Figure 7:
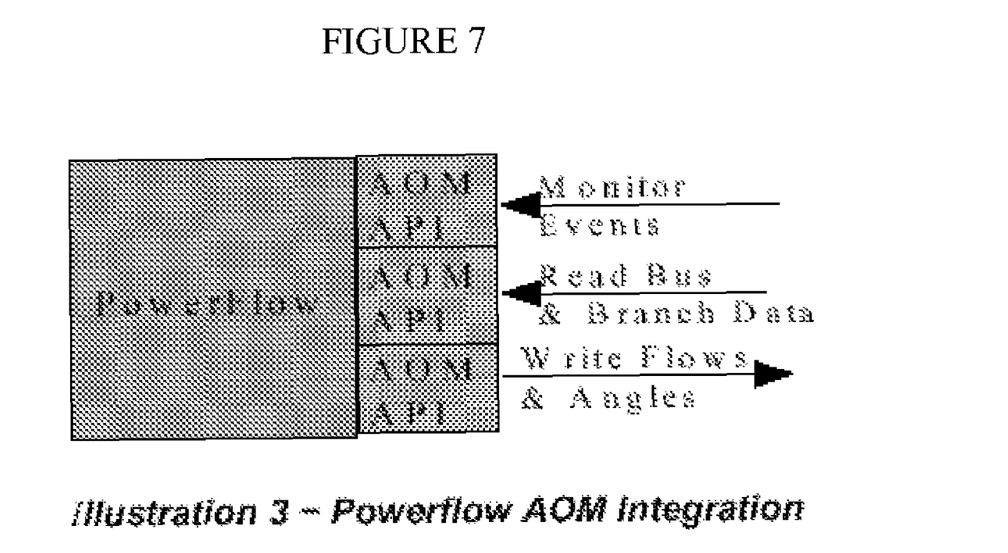
FIG. 7 is an illustration of the PowerFlow with new interface.

The Branches class attributes are:
BranchID—unique identifier for the branch
PBus—from bus
QBus—to bus
R—resistance X—reactance
Flow—branch flow, output by powerflow The next step is to implement the powerflow assuming that these classes exist just as we described them. FIG. 7 illustrates the powerflow application with its new interfaces. Notice that the data manipulation section 60 from FIG. 6 has been removed since our object definitions reflect the objects in the exact format that we want to use them in.

Another important aspect of this approach is that no part of this implementation will need to be changed as a result of changes to another part of the system, even if the database, middleware and data model were all replaced. This assumption is proven by the fact that the design for the interface does not take the database API, middleware API or data model into account. Instead, only the logical or abstract view of the objects and the AOM API are significant to the application.

At this point the application developer is finished and the application is ready to be integrated into a variety of systems.

Abstract Object Model Integration

Integration of abstract object model based applications may seem like a difficult task, but it turns out to be quite reasonable. Somehow the abstract objects used by the application must be mapped into the real objects managed by the target system. In order for this to happen the integrator must ask some important questions:

What API is used to monitor for events?
What API is used to access the data?
How is the data formatted?
How does it need to be altered before it can be used by the powerflow application?
Where should the results be stored?
How should the results be formatted to meet the needs of the data model?
Is a middleware used or is the access local?
What performance issues are there to worry about?

In fact, this list is exactly the same list that the application developer had to ask in the on the Traditional Approach. If the same issues still need to be addressed, then what is the benefit of the abstract object modeling approach?

The primary benefit is that the application is now independent from any implementation technology except for the language it is written in. The application developer is able to focus only on the core application functionality, without any concern for future deployment issues, yet the resulting application is able to be integrated into any conceivable system.

The application integrator has the advantage of a well defined API and should receive documentation of the abstract objects assumed by the application from the application's author. The API is an important aspect because it is the same no matter which objects are being represented. This is a similar idea to a relational database. The database API is the same no matter what type of information is logically represented in the tables.

The primary difference between a relational database and the abstract object model approach is that instead of tables the abstract object model API interacts with fully functional objects, including behavior as well as attributes. However, the principle remains the same.

The integrator can approach the integration of a specific abstract object model based application in a number of ways:

Write custom adaptors that communicate with the database or middleware and then present the information as the application expects. This would be a similar amount of total work to the traditional approach, but with the added benefit that it does not require any involvement from the application developer.

Write adaptor tools that dynamically map the information from the database or middleware based on configuration files. This allows an integrator to add applications without requiring any new code.

Purchase third party tools that dynamically map between common data sources, such as Oracle or Ingres databases, comma separated value files, and wrap common middleware such as CORBA, COM, XML-RPC or SOAP. Such tools can be obtained from PowerData Corporation and EPRI today and most likely other vendors in the future.

The integrator also has an economy of scale situation, in that the target system interfaces only need to be resolved a single time. For example, if the target system uses Oracle then only one Oracle abstract object model wrapper is needed regardless of the number of applications being integrated.

Existing Abstract Object Model Applications

At this time a number of applications, databases, and user interfaces have either been developed using abstract object modeling or adapted using a wrapper so they can participate in an abstract object modeling system. This work is on-going and the list continues to grow rapidly.

Applications:
EPRI Operator Training Simulator
EPRI Topology Processor
EPRI Linear Power Flow
EPRI IPFLOW
EPRI PSADD
PCA State Estimator
PCA Operator Power Flow
Mitsubishi Electric SCADA FEP
User Interfaces:
PowerVisuals Java base GUI
Web based utilities
Databases and Persistent Storage:
PowerData real-time database
Oracle
Ingres
Comma Separated Value Files
Communications (provides a transparent bridge so that an application running on one machine can access objects on another):
XML over TCP/IP
CORBA
Conversion Utilities (provides re-mapping services to dynamically convert objects from one representation to another):
Join Engine
Expression Engine
GroupBy Engine
Filter Engine
Masquerading Engine
Sort Engine
Miscellaneous Utilities:
Security Engine
Journaling Engine
Generalized Import/merge Engine
Generalized Export Engine

CONCLUSIONS

The primary objective of an application developer or researcher is to transfer their knowledge in a particular area into an automated form. If this automated result is well packaged and without dependencies it can be reused as part of an ever increasing basic infrastructure that is available to others. However, this objective is rarely realized do to the difficulty in building truly plug & play complex applications.

The abstract object modeling approach is a methodology that overcomes this difficulty, separating the integration problem from the application development problem, resulting in truly re-usable and greatly simplified applications. It is a methodology that applies equally well to user interfaces, database systems, communication systems and application engines. It is also not limited by platform or implementation language. As a result, systems become a collection of building blocks, each provided by different experts without any prior coordination. The system integrator is able to mix and match these blocks to create a system that meets their needs.

While several embodiments and examples of the invention have been illustrated and described, it is to be understood that various changes may be made therein without departing from the spirit and scope of the invention. Hence, the invention is to be limited only by the scope of the following claims and the equivalents thereof.

All of the above U.S. patents, U.S. patent application publications, U.S. patent applications, foreign patents, foreign patent applications and non-patent publications referred to in this specification and/or listed in the Application Data Sheet, including but not limited to U.S. patent application Ser. No. 10/047,457, filed on Jan. 14, 2002, entitled "METHOD AND SYSTEM FOR CREATING REUSABLE SOFTWARE COMPONENTS THROUGH A UNIFORM INTERFACE," and U.S. Provisional Application No. 60/261,119, filed on Jan. 12, 2001, entitled "METHOD AND SYSTEM FOR CREATING REUSABLE SOFTWARE COMPONENTS THROUGH A UNIFORM INTERFACE," are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A method in a computer system for providing an interface between at least one logical view of a relational database and a plurality of normalized relational database tables having stored data, comprising:
    receiving an indication of an operation to be performed on the at least one logical view, the at least one logical view including at least one combination of tables from a plurality of normalized relational database tables, the combination previously constructed without reference to foreign keys in the plurality of tables, the foreign keys reflecting a database relationship between the plurality of tables, and wherein the at least one logical view includes at least one virtual attribute that is not stored directly in the plurality of tables and that is a result of a calculation;
    automatically determining the corresponding plurality of normalized relational database tables that were used to construct the at least one logical view; and
    transparently and automatically causing the stored data in the corresponding plurality of normalized relational database tables to be adjusted in accordance with the indicated operation, thereby automatically performing the indicated operation on underlying data that corresponds to the logical view.

2. The method of claim 1 wherein the automatically determining the corresponding plurality of normalized relational database tables comprises:
    retrieving from a definitions file indications of a plurality of stored tables and attributes that correspond to a join operation used to construct the at least one logical view.

3. The method of claim 1 wherein the transparently and automatically causing the stored data in the corresponding plurality of normalized relational database tables to be adjusted in accordance with the indicated operation, further comprises:
    retrieving, from a definitions file associated with the at least one logical view, computer instructions for performing a database insert operation on at least one of the corresponding plurality of normalized relational database tables in accordance with the indicated operation; and
    automatically performing the computer instructions to adjust the underlying data in accordance with the indicated operation.

4. The method of claim 1 wherein the indicated operation is at least one of a create object or a delete object operation.

5. The method of claim 1, further comprising:
    receiving an indication of an event from one of the normalized relational database tables;
    determining at least one corresponding logical view that was constructed using the one of the normalized tables; and
    automatically notifying the determined logical view of the indicated event.

6. The method of claim 1, further comprising:
    receiving an indication of an expression that includes at least one of a mathematical expression, a function, an attribute reference, or a conditional operation; and
    performing the expression to generate at least one of a retrieved data from the database, a value, or a virtual attribute in the at least one logical view.

7. The method of claim 1 wherein the transparently and automatically causing the stored data in the corresponding plurality of normalized relational database tables to be adjusted in accordance with the indicated operation, further comprises:
    using a join cache to persistently maintain linkages between the stored tables and attributes and the at least one logical view.

8. The method of claim 7, further comprising:
    determining whether the data in columns represented by the join cache has changed; and
    when it is determined that the data in the columns represented by the join cache has changed, recalculating the join thereby updating the at least one logical view.

9. The method of claim 1 wherein the stored data has multiple records, each record having multiple attributes, and wherein the at least one logical view includes an enumeration of attribute values that convey a logical meaning outside of the database tables.

10. A computer readable storage medium containing content that enables a software application in a computing device to manipulate relational database data through logical views, by performing:
    receiving an indication of an operation to be performed on the at least one logical view, the at least one logical view including at least one combination of tables from a plurality of normalized relational database tables having stored data, the combination previously constructed without reference to foreign keys in the plurality of tables, the foreign keys reflecting a database relationship between the plurality of tables, and wherein the at least one logical view includes at least one virtual attribute that is not stored directly in the plurality of tables and that is a result of a calculation;
    automatically determining the corresponding plurality of normalized relational database tables that were used to construct the at least one logical view; and
    transparently and automatically causing the stored data in the corresponding plurality of normalized relational database tables to be adjusted in accordance with the indicated operation, thereby automatically performing the indicated operation on underlying data that corresponds to the logical view.

11. The computer-readable storage medium of claim 10 wherein the computer-readable medium is a memory of the computing device.

12. The computer-readable storage medium of claim 10 wherein the contents are instructions that, when executed, cause the computing device to perform the method.

13. The computer-readable storage medium of claim 10 wherein the stored data has multiple records, each record having multiple attributes, and wherein the at least one logical view includes an enumeration of attribute values that convey a logical meaning outside of the database tables.

14. A computing system for enabling a software application in a computing device to manipulate relational database data through logical views of a relational database, comprising:
   a memory;
   a definitions file having a plurality of sections that define a correspondence between stored data in a plurality of stored normalized relational database tables and one or more logical view tables, such that at least one of the logical view tables is constructed without using a foreign key reference from any of the plurality of tables, the foreign keys reflecting a database relationship between the plurality of tables, and wherein the at least one logical view tables includes at least one virtual attribute that is not stored directly in the plurality of tables and that is a result of a calculation; and
   a database join engine stored in the memory and configured, when executed, to automatically interface between at least one logical view table and a corresponding plurality of stored normalized tables of the relational database such that, when an operation is performed on the at least one logical view table, underlying stored data is automatically manipulated in the corresponding plurality of stored normalized database tables.

15. The computing system of claim 14, wherein the definitions file further comprises a join cache definition that indicates a cache to maintain persistent linkages between attributes in the stored normalized tables and the at least one logical view.

16. The computing system of claim 14 wherein the operation is at least one of a create object or a delete object operation.

17. The computing system of claim 14 wherein the stored data has multiple records, each record having multiple attributes, and wherein the at least one logical view includes an enumeration of attribute values that convey a logical meaning outside of the database tables.

18. A computer-implemented method for generating an object according to an abstract object model for use as a reusable software component, comprising:
   instantiating code for the object that corresponds to a plurality of uniform functions;
   instantiating code for the object that corresponds to at least one abstraction conversion tool, the abstraction conversion tool driven by a definitions file having a plurality of sections that define a correspondence between stored data and one or more objects representing at least some of the stored data such that the definitions file may be changed without recompiling code for the one or more objects; and
   instantiating code for the object that implements a plurality of object behaviors including notification of a change to an attribute of the object, notification of an addition of an attribute to the object, and notification of a removal of an attribute of the object;
   wherein the generated object implements logical views of normalized tables in a relational database, at least one of the logical views including at least one virtual attribute that is not stored directly in the normalized tables and that is a result of a calculation.

19. The method of claim 18 wherein the instantiating code that corresponds to the plurality of uniform functions comprises:
   instantiating code for the object that implements functions to read an attribute of the object, write an attribute of the object, get attribute names of the object, invoke a behavior on the object, and get related objects.

20. The method of claim 18, further comprising:
   instantiating code for the object that implements a plurality of object behaviors including notification of adding an object to a set of objects and notification of deleting an object from a set of objects.

21. The method of claim 18 wherein the instantiating code for the object that corresponds to at least one abstraction conversion tool further comprises:
   instantiating code for the object the corresponds to an abstraction conversion tool that implements operations that correspond to at least one of object masquerading, object selection, object projection, object concatenation, object joins, property calculations, object bridging, object monitors, or system wrappers.

22. The method of claim 18 wherein the generated object is a join engine that implements logical views of normalized tables in a relational database.

23. The method of claim 18 wherein the generated object is used to create a powerflow application.

24. The method of claim 18 wherein the stored data comprises data stored in a plurality of relational database tables.

* * * * *